March 6, 1945.  R. M. L. ISSALY  2,370,963
WOODEN SOLE FOR SHOES
Filed Nov. 9, 1942  2 Sheets-Sheet 1
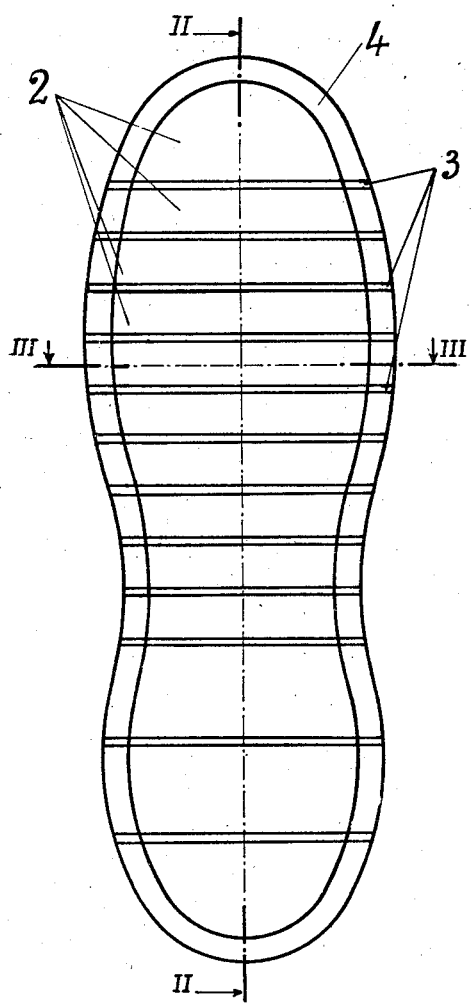
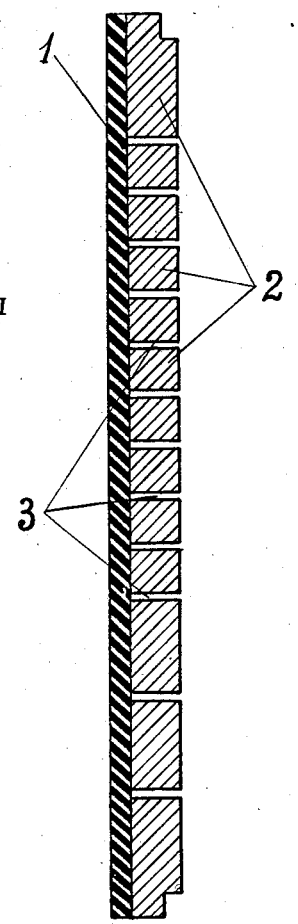
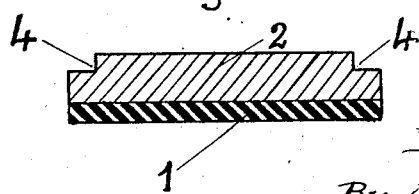

March 6, 1945.  R. M. L. ISSALY  2,370,963
WOODEN SOLE FOR SHOES
Filed Nov. 9, 1942  2 Sheets-Sheet 2
Fig. 4
Fig. 5
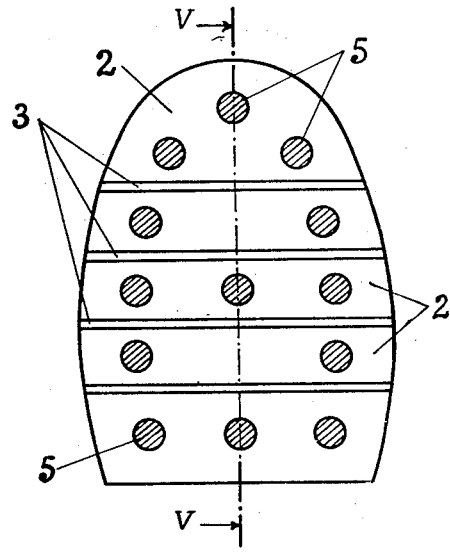
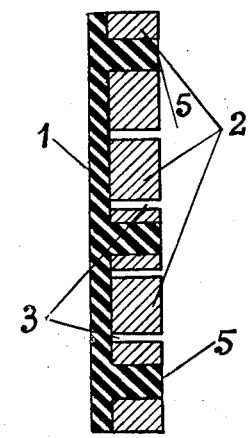
Fig. 6
Fig. 7
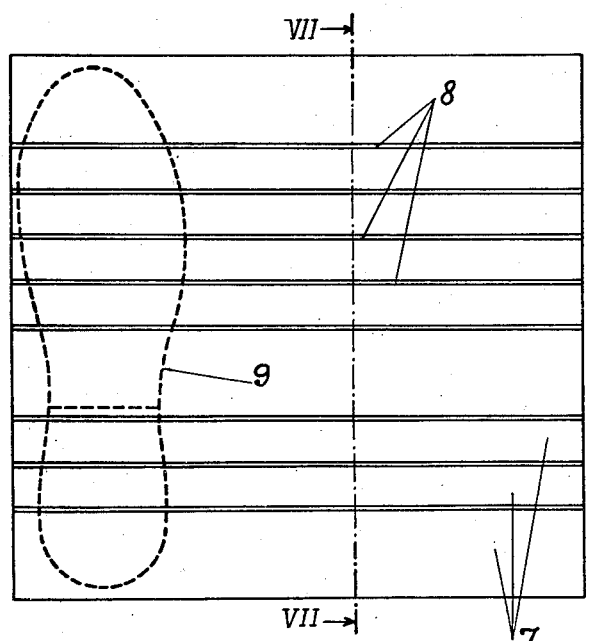
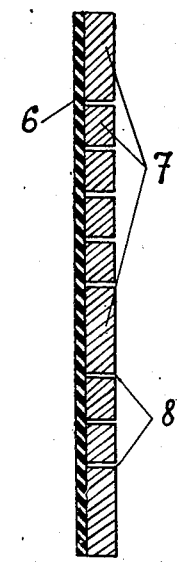
Inventor
R. M. L. Issaly
By Hancock Downing See Sill
Attys.

Patented Mar. 6, 1945

2,370,963

UNITED STATES PATENT OFFICE 2,370,963

WOODEN SOLE FOR SHOES

Raoul Marcel Laurent Issaly, La Tronche, France; vested in the Alien Property Custodian Application November 9, 1942, Serial No. 465,944
In France June 24, 1941

11 Claims. (Cl. 18—47.5)

At the present day wood is currently used for manufacturing the soles of shoes. Owing to the lack of flexibility of this material, it has been proposed to use wooden soles in which a certain amount of flexibility was obtained by providing said soles with hinges and/or springs, or by forming notches in the wooden board constituting the sole. But these arrangements have serious inconveniences; in particular they weaken the sole which might easily break; they do not take into account that the wood swells under the action of dampness which may result in an unpermissible distortion of the shoe; finally they provide soles which are not watertight and which, for this reason, must be mounted on an insole, made either of leather or other similar material.

The invention has for its object a wooden sole for shoes which is watertight and has all the desired properties of flexibility, but does not offer the above mentioned inconveniences.

Said soles are constituted by wooden treads or cleats parallel to each other, at right angles to the longitudinal axis of the sole and stuck on a supporting plate made of flexible and waterproof material such as, for instance, a composition mainly made of rubber or of natural or synthetic resins.

According to another feature, the wooden treads are suitably spaced apart for allowing them to swell without distorting the sole.

According to the invention also, the wooden soles thus constituted are provided with wear resisting material housed in holes provided in the wooden treads and completely passing through the same.

The invention has also for its object a method for manufacturing the soles such as above described and which consists in utilising as support, a plate formed of a composition mainly made of rubber or of natural or synthetic resins and in applying said plate on the wooden elements by simultaneous pressure and vulcanization by means of a hot press.

For obtaining the final sole, according to the invention, the supporting plate can be cut out to the desired shape and dimensions, it can be placed in a mould, wooden treads previously cut to the required dimensions can then be arranged on said support parallel to each other by interposing between them spacing members of the same height and length constituted, for instance, by metal strips made of soft steel, the width of which is equal to that of the space which is to be maintained between the wooden treads, then after having closed the mould with a cover, the whole can be placed between the heating plates of a vulcanizing press of any known type.

According to another preferred embodiment of the invention use is made of a large wooden board, rectangular for instance, the thickness of which is that of treads; on said board is stuck by vulcanization under pressure a supporting plate of the same dimensions; in the wooden board are cut, by means of a suitable tool such as a circular saw, parallel grooves of the required width and penetrating to the supporting layer; then, in the compound and flexible plate thus obtained, final soles are cut to the required shapes and dimensions.

In the accompanying drawings, given by way of example,

Fig. 1 is a plan view of a sole according to the invention;

Fig. 2 is a section made according to line II—II of Fig. 1;

Fig. 3 is a section made according to line III—III of Fig. 1;

Fig. 4 is a plan view of a sole according to the invention provided with protecting blocks;

Fig. 5 is a section made according to line V—V of Fig. 4;

Fig. 6 is a plan view of a compound plate obtained by the method according to the invention;

Fig. 7 is a section according to line VII—VII of Fig. 6.

Referring to the drawings, the sole illustrated in Figs. 1 to 3 is composed of a supporting plate 1 made either of a composition mainly made of rubber or of natural or synthetic resins, or of fabric waterproofed by impregnation with rubber or resin, about 2.5 mm. thick and on which are stuck the wooden treads 2, which are about 10 mm. wide, 7 mm. thick and spaced apart to form grooves 3 about 1 mm. wide. The rods 2 have different widths according to their location on the sole, those at the tip and at the heel being wider, so as to reinforce these parts of the sole.

It will be seen that this wooden sole is waterproof; it has in the longitudinal direction, the flexibility of the support 1 and the latter can serve as insole for the assemblage of the shoe which is thus greatly simplified. The space 3 left between the rods 2 allows the latter to swell under the action of dampness without producing the distortion of the sole and of the shoe on which it is secured.

The assemblage on the shoe can be effected by stitching, sticking or nailing. Said sole can also be mounted by milling its edges on the tread side at 4 and by securing on the milled part a welt made of leather or rubber which protects the edges of the wooden elements 2 and allows the sole to be stitched on the welt of the shoe.

In Figs. 4 and 5 on a similar sole has been illustrated provided with blocks 5 made of wear resisting material such for instance as rubber or plasticized polyvinyl chloride. Said blocks 5 which completely pass through the rods 2 in holes provided for that purpose can form part of the support 1 or be stuck thereon.

Owing to this arrangement the sole wears uniformly and much less rapidly, the protecting material being present until it is completely worn out.

For manufacturing soles such as those above described, the following method can be adopted:

In a mould of suitable shape is arranged a plate having the shape of the final sole and of a composition mainly made of rubber or of resins; on said support are arranged the wooden elements parallel to each other and at right angles to the longitudinal axis and between each two successive elements is interposed a metal strip made of soft steel having the same length and height as the adjacent elements and a width equal to the free space to be reserved between said elements. The mould is closed and placed between the two plates of a vulcanizing press. When the vulcanization is terminated the sole is removed from the mould, then the metal strips are removed. It will then be seen that the wooden treads adhere perfectly to the support and that a sole is obtained such as that illustrated in Figs. 1 to 3.

The following method might also be adopted: Instead of using a mold of small dimensions having the shape of the sole, use is made of a mould of large dimensions and of simple shape; for instance a rectangular mould and in said mould is arranged a supporting plate 6 of the same shape on which are placed rectangular wooden treads 7 the length of which is equal to one of the dimensions of the mould and of the support and the width and thickness of which are equal to those of the wooden elements of the sole to be obtained. Between each two successive wooden treads 7 is introduced a metal strip. After vulcanization between the plates of a press and removal of the metal strips, a compound plate is obtained such as that illustrated in Figs. 6 and 7 comprising a supporting plate 6 on which are stuck wooden treads 7 separated by intervals 8. It is then simply necessary to cut out, according to the dotted lines 9 with a suitable tool, the soles to be obtained, as is done in a hide for leather soles.

According to another preferred method of carrying out the invention, the following operations are effected: On a plate of a composition mainly made of rubber intended to serve as support, is stuck by vulcanization under pressure or by means of a suitable solution, a sheet or board of wood having a thickness equal to that of the elements of the sole to be obtained. Once said compound plate obtained, it suffices, by means of a tool, composed for instance of a number of circular saws secured on one shaft, to cut out in the thickness of the wood parallel grooves extending through to the surface of the rubber and having a width of the order, for instance, of 1 mm. A plate similar to that illustrated in Figs. 6 and 7 is then again obtained.

By simply modifying the interval between the various circular saws, it is possible to obtain more or less wide wooden elements according to the place they are to occupy on the sole to be manufactured. By the same method, a final sole can also be immediately obtained; the sole having been cut out to the required shape in a wooden board and the support of the same shape having been stuck, parallel grooves are cut in the wooden sole by means of a circular saw.

For obtaining a sole such as that which is illustrated in Figs. 4 and 5, use can be made of any one of the above described methods, care being taken to provide in the wooden elements, holes which completely pass through them. In order to insert in said holes blocks of wear resisting material, one or the other of the following methods can be adopted:

The holes being formed in the wooden treads or the board, rubber cylinders are forcibly inserted therein, having a diameter slightly greater than that of the holes which allows them to adhere to the wooden elements. This adherence to the sole is moreover increased when the support is stuck on the wooden elements, as the support is then also stuck on the internal base of the cylinders.

According to another embodiment, the holes being formed in the elements, and the latter as well as the support being placed in the mould before vulcanization under the sole action of heat and pressure when said vulcanization is effected, the rubber of the support penetrates into the holes and fills them up and the wear blocks thus constituted are formed of vulcanized rubber forming an integral part of the support.

For further improving the wear resisting property of the sole, on the tread side of the wooden elements can be stuck a sheet made of a good wear resisting material, such as polyvinyl chloride. This supplementary application can be effected at any moment of the cycle of manufacture.

The repairing of the soles obtained by any one of the above described methods can be very simply and rapidly effected in the following manner: All the worn wooden treads are removed and replaced by new treads of the same length and of suitable thickness which are, either stitched by hand, or stuck and nailed.

Having now described my invention what I claim as new and desire to secure by Letters Patent is:

1. A method for manufacturing a flexible wooden sole for shoes which consists in arranging wooden elements on one face of a waterproof flexible plate adapted to be vulcanized and simultaneously pressing and heating said plate and said elements together so as to vulcanize said plate and to stick the same on said elements.

2. A method for manufacturing a flexible wooden sole for shoes which consists in arranging wooden elements in parallel relation and at a distance from each other on one face of a waterproof flexible plate adapted to be vulcanized, placing spacing members in the spaces between said elements, simultaneously pressing and heating said plate and said elements together so as to vulcanize said plate and to stick the same on said elements removing said spacing members, and cutting out of the composite plate so obtained pieces having the shape of the sole to be obtained.

3. A method for manufacturing a flexible wooden sole for shoes which consists in arranging on one face of a waterproof flexible plate adapted to be vulcanized and having the outline of the sole to be obtained wooden elements in parallel relation and at a distance from each other, placing spacing members in the spaces between said elements, simultaneously pressing and heating said plate and said elements together so as to vulcanize said plate and to stick the same on said elements, and removing said spacing members.

4. A method for manufacturing a flexible wooden sole for shoes which consists in arranging perforated wooden elements upon one face of a waterproof flexible plate adapted to be vulcanized, inserting wear-resisting blocks through said perforations into engagement with said flexible plate, and simultaneously pressing and heating said elements and blocks upon said plate to thereby vulcanize the parts together.

5. A method for manufacturing a flexible wooden sole for shoes which consists in arranging perforated wooden elements upon one face of a vulcanizable flexible plate, compressing relatively resilient wearing blocks into said perforations and into engagement with said plate member, and simultaneously pressing and heating said elements and blocks upon said plate to thereby vulcanize the parts together.

6. A method of manufacturing flexible wooden soles for shoes which consists in spacing perforated wooden elements upon one face of a sheet-size vulcanizable flexible plate, then supporting said spaced elements against lateral displacement while simultaneously pressing and heating said elements and plate to cause material from said plate to melt and flow into said perforations, and then cutting sole-size pieces out of said plate and attached elements.

7. A method of manufacturing a flexible wooden sole for shoes which consists in arranging perforated wooden elements upon one face of a vulcanizable flexible plate, and then applying heat and pressure to cause material from said plate to flow into and fill said perforations, whereby wear-resisting blocks are formed integrally with said plate and within said perforations.

8. A method of manufacturing a flexible wooden sole for shoes which consists in arranging perforated wooden elements upon one face of a vulcanizable flexible plate, and then securing the proximate faces of said plate and elements together while forming wear-resisting blocks within said perforations integrally with and from the material of said plate.

9. A method for manufacturing a flexible wooden sole for shoes which consists in arranging wooden elements in spaced relation to each other on one face of a waterproof flexible plate adapted to be vulcanized, supporting said arranged elements against lateral displacement, and simultaneously pressing and heating said plate and said elements together so as to vulcanize said plate and to stick the same on said elements.

10. A method of manufacturing flexible soles for shoes which consists in arranging adjacent edges of substantially rectangular wearing elements in spaced relation to each other and upon one face of a sheet-size vulcanizable flexible plate, supporting said arranged elements against lateral displacement, simultaneously pressing together and heating said plate and said wearing element so as to vulcanize said plate and to stick the same to said elements removing said supporting means, and then cutting sole-size pieces from said plate and the attached elements.

11. A method for manufacturing flexible composite sheets from which wear plates such as shoe soles and the like may be cut which consists in arranging adjacent edges of polygonal wearing elements in spaced relation to each other and upon one face of a vulcanizable flexible plate, inserting spacing elements in the spaces between the adjacent edges of said wearing elements, pressing together and heating said flexible plate and wearing elements so as to vulcanize the wearing elements to the flexible plate, and then removing said spacing elements.

RAOUL MARCEL LAURENT ISSALY.